3,271,828
CONSUMABLE ELECTRODE PRODUCTION
OF METAL INGOTS
Stephen Matheson Shelton, Henry Gordon Poole, and Frank Roy Wagy, Albany, Oreg., assignors to Oregon Metallurgical Corporation, Albany, Oreg., a corporation of Oregon
Filed Sept. 20, 1963, Ser. No. 310,425
3 Claims. (Cl. 22—200)

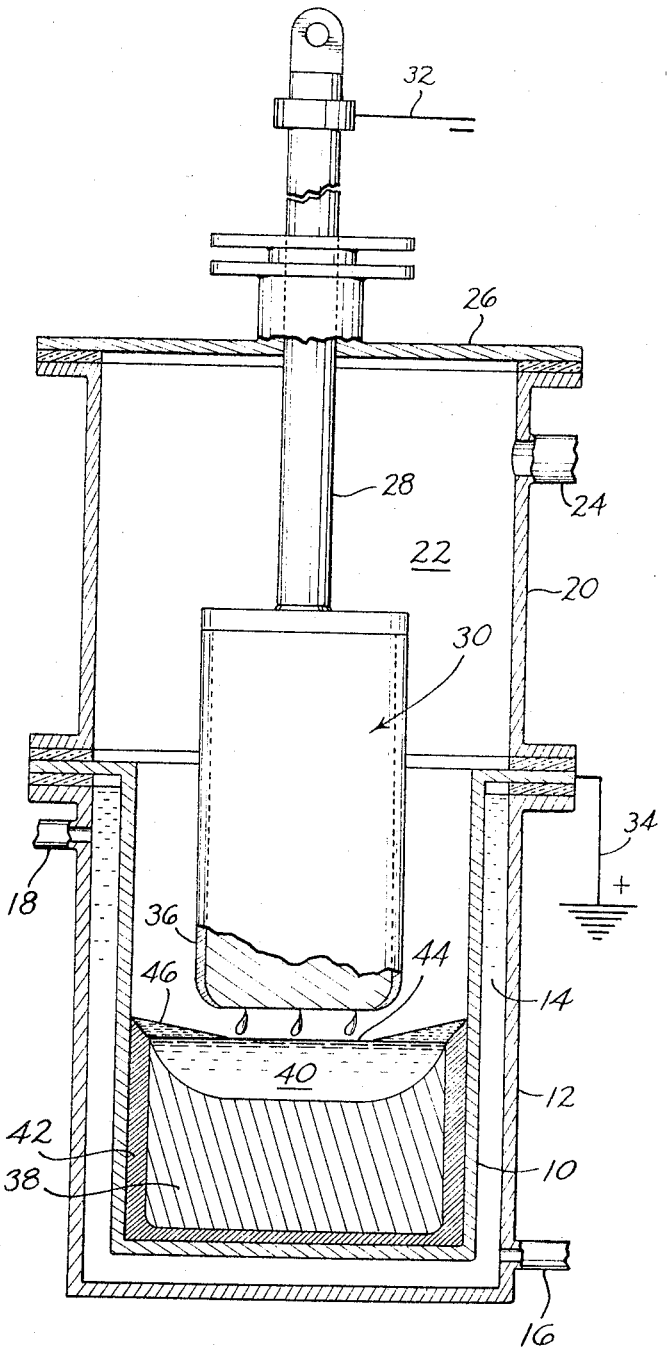

This invention relates to improvements in the manufacture of metal ingots from metal bodies. More particularly, the invention relates to a process for the production of metal ingots, which makes possible the relatively easy production of ingots of superior quality from a starting material of only ordinary grade.

In recent years, there has developed a substantial demand for iron, nickel, cobalt, chromium, and similar alloys of the highest possible quality, whereby said alloys may possess the greatest possible strength and long temperature service life. Many of these alloys may be of a refractory nature, and because of their high melting points present special preparation and refining problems.

In general terms, this invention contemplates a consumable electrode, arc melting process whereby metal bodies are fused, carried on with the progressive addition of successive increments of fresh flux for slagging purposes. The process is carried out using controlled conditions and operating procedures, whereby metal ingots may be formed of uniform high quality, capable of meeting the most exacting of the reliability standards applied by industry today. Alloys may be prepared characterized by minimal objectionable alloy segregation, and uniformly good grain structure. Of particular importance is the superior cleanliness which is possible in alloys prepared as contemplated. Tests reveal that ingots produced according to the invention contain at the most only very small amounts of the usual impurities, and substantially the complete absence of undesirable inclusions and interstitials.

Generally, therefore, an object of this invention is to provide an improved method for making quality ingots conforming to high standards of cleanliness.

More specifically, an object of the invention is to provide an improved method for making such ingots, which relies upon the progressive addition of successive increments of fresh flux to the metal which is to form the ingot concurrently with arc fusing of the metal (said flux fusing at the same time that the metal fuses), and the progressive removal of flux containing impurities (i.e., slag) from the fusion zone existing during such arc fusing. Thus, with the method, the quantity of flux in a fused state is controlled within predetermined limits. Through such successive additions of fresh flux and progressive removal of slag, flux or slag-forming material in a pure or almost pure state is continuously present in the region where fused metal is first formed, so that such slag-forming material possesses maximum solvency power for those impurities which it is sought to remove from the fused metal.

Another object is to provide a method for producing ingots, which enables close control of slag composition, through control of the progressive addition of flux increments to the fusion zone in the process.

A further object is to provide an improved process for producing metal ingots, that permits controlled environmental conditions, such as a fully established vacuum, to be maintained throughout the zone where fusion of metal takes place. Through continuously removing flux as fresh flux is added, an arc contact area or "anode point" on the top of the molten pool of metal that is produced by fusion of metal is continuously kept open. In this way, uniform subatmostpheric pressure conditions may be maintained throughout the fusion zone.

A still further object is to provide a method for producing metal ingots which relies upon successive additions of flux, and movement of the electric arc producing fusion to effect mixing of this flux and fused metal.

These and other objects and advantages are attained by the invention, and the same is described hereinbelow in conjunction with the accompanying drawings, wherein:

FIG. 1 illustrates diagrammatically, arc-fusing apparatus such as may be used in the invention; and FIGS. 2 and 3 illustrate a modified form of an electrode for the apparatus (FIG. 3 being a cross sectional view along the line 3—3 in FIG. 2).

As already indicated above, the process of this invention comprises the electric arc fusing of a consumable electrode, under properly controlled conditions and procedures whereby a high-quality ingot is produced. Apparatus in which such a process may be carried out is illustrated diagrammatically in the drawing, and this apparatus will first be described.

Referring to the drawings, and more particularly FIG. 1, 10 indicates generally an ingot mold (shown in cross section) which ordinarily may be made of copper, and which functions to receive fused metal in the preparation of an ingot. Ingot mold 10 fits within a jacket 12 which extends under and around the sides of the mold. Mold 10 on all sides is spaced inwardly from the inside of jacket 12, so that an annular space 14 exists around the mold, which may be used for circulating a coolant, such as water.

An inlet for such a coolant is shown in the form of a conduit 16 extending through jacket 12 adjacent the base thereof. Conduit 18, which extends through the jacket adjacent the top thereof, provides an outlet for such coolant.

Fitting over the top of jacket 12 and sealed thereto is housing structure 20 defining a chamber 22 located above mold 10 that communicates with the inside of mold 10. A conduit 24 extends through a side of housing 20, which may be connected to a vacuum source when it is desired to evacuate chamber 22 and the inside of mold 10.

If an inert gas environment is to be used in the process, a pair of conduits similar to conduit 24 may be provided, to enable the inert gas to be circulated through chamber 22. In this case, one of these conduits would provide a course for introducing inert gas to chamber 22, and the other would provide a course for withdrawing the gas whereby the gas is circulated.

Extending through wall 26 closing off the top of housing 20 is a rod 28. Rod 28 is vertically movable relative to wall 26. An electrode 30 is attached to rod 28. The rod is lowered toward the mold 10 during the arc melting process, thus to advance progressively the base of the electrode attached thereto, as successive portions of this electrode are consumed.

Conductors for producing an arc-forming electric current between electrode 30 and ingot mold 10 are shown at 32 and 34. As in the case conventional arc melting apparatus, conductor 32 (and thus consumable electrode 30 through electrically conductive rod 28) is connected to a negative voltage source. Conductor 34 (and mold 10) is connected to a positive voltage source.

According to this invention a metal body, i.e., an electrode, is supported over ingot mold 10 with the latter in position to receive fused metal dropping and thus separating from the electrode. An arc is passed between the metal body and the ingot mold, which causes metal at the lower end of the electrode to fuse, and fused metal dropping from the electrode produced by this arc collects within the mold to form a pool therein. Concurrently with such arc fusing of the electrode, successive increments of fresh flux are added progressively into the heat zone that results from the production of the electric arc. These successive portions of flux fuse upon being introduced to the heat zone, become mixed with the fused metal collecting in the ingot mold. Mixing is promoted by movement of the arc, which wanders about in the space between the electrode and the collecting pool of fused metal.

Flux after it has been added and become fused, and after dissolving impurities in the molten metal, is continuously rejected as slag to the side walls of the ingot mold. The area on the surface of the molten metal pool contacted by the arc, also referred to herein as the "anode spot," remains open, i.e., free of any flux covering, so that the process of the invention may be thought of as an "open arc" melting process. Flux as slag after being rejected from the arc contact area is prevented from returning to the arc contact area by cooling and solidifying on the walls of the ingot mold. The amount of fresh flux added is controlled so as not to exceed the amount of flux removed.

Through using an open arc, and because increments of fresh flux are progressively added with the removal of slag, more efficient removal of impurities results (the flux being pure or having only a low concentration of impurities when performing its fluxing action). The agitation which results in the molten metal through movement of the arc promotes mixing of the fused metal with the fresh additions of flux. Because of the open arc contact area or anode point, controlled non-atmospheric environmental conditions exist adjacent the molten pool, and interstitials and other relatively volatile impurities may be removed from the molten metal with maximum efficiency by degasification of the molten metal. To explain further, any vacuum maintained about the electrode extends uniformly down to the surface of the molten pool that lies within the arc contact area, so that a full vacuum advantage is realized. Where an environment of inert gas is used, the uncovered anode point or arc contact area permits complete control of the environmental conditions directly over the molten pool.

According to the invention, a variety of flux materials may be used. The nature of the specific flux employed depends upon the type of metal being processed into ingots and the type of product desired. Exemplary of fluxes that may be used are silicates such as glass, mineral wool, fluorites, lime, etc.

One of several different modes of addition of the flux progressively during the arc-fusing process may be used. Thus, according to one method it is contemplated that a wrapping of flux be prepared about the electrode or metal body, which automatically is progressively lowered into the heat zone produced by the arc as the electrode is consumed. This wrapping may comprise a glass or mineral wool wrapping mechanically secured to the outside of the electrode. Alternatively, a spray coating of flux may be prepared whereby a fused layer is produced on the outside of the electrode. In some instances a plaster adhesive coating of flux on the outside of the electrode is desirable. Fresh flux additions may also be produced by the arc fusing of an electrode prepared from a mixture of flux and metal consolidated into electrode form. Where it is desired to control flux additions independently of the rate at which the electrode is consumed, the flux may be fed by means operating independently of the means feeding the electrode. The incorporation of the electrode and the flux together as one unit, however, has unique advantages, including the fact that the melting operation is quite simple, and that the only operation that need be performed is to lower the electrode at the required rate whereby the desired arc is produced.

In FIG. 1, and further explaining the above, consumable electrode 30 is shown with a flux covering 36 extending about the sides thereof, such as may be produced by spraying fused flux on the outside of the electrode and allowing the flux then to harden on the electrode. The apparatus is shown with ingot mold 10 partially filled with metal. Solidified metal in the ingot mold is indicated at 38. A molten pool of metal above the solidified metal is shown at 40. A layer of slag, produced by the progressive additions of flux, which has solidified adjacent the ingot mold and extends around metal 38 is indicated at 42. A flux contact area or anode point (which is free of flux) is indicated at 44. Flux in the process of being rejected toward the side walls of the mold, and prior to hardening, i.e., still in molten form, is indicated at 46.

The invention is further explained with reference to the following example, which is included for the purposes of illustration, and not for the purpose of limiting the invention:

EXAMPLE I

In this example, rail steel was refined to produce a metal ingot substantially free of interstitials, inclusions (such as high melting point nitrides), and impurities (such as phosphorous and sulfur).

Initially, an electrode was prepared from steel rails, by welding rails together in a bundle, as shown in FIGS. 2 and 3, where rails 50, 52 have been joined together to form an electrode 54. These steel rails were secured, through an electrode stub, such as stub 56 to a rod, such as rod 28. An elongated steel conduit was filled with flux, and pinched at intervals along the length thereof. This conduit was then fastened (by welding) to the side of the electrode. Such a conduit is shown in FIGS. 2 and 3 at 58. Pinches in the conduit (to prevent the flux from falling out) are indicated at 59. The flux inside the conduit is shown at 61.

An ingot mold or crucible approximately 9 inches in diameter was used to collect the fused metal separating from the electrode during the process. Before the process was started, some steel turnings and a little flux were added to the base of the ingot mold.

The materials that went into the arc-fusing process, and their proportions, are tabulated below:

*Table I*

| Raw steel: | Pounds |
|---|---|
| Electrode stub | 33 |
| Rails | 332 |
| Steel turnings to mold base | 15 |
| Steel in conduit holding flux | 21 |
| Total | 401 |
| Flux: | |
| $CaF_2$ | 5.205 |
| $CaO$ | 5.205 |
| $MoO_3$ | 5.205 |
| $Fe_2O_3$ | 3.815 |
| Total | 19.430 |

(0.840 lb. of flux went to base of ingot mold, and 18.590 lbs. of flux went to the inside of the steel conduit.)

After proper mounting of the electrode in apparatus of the type illustrated in FIG. 1, the system was evacuated to a pressure of about 300 microns of mercury. The electrode was lowered inside the ingot mold, to place the bottom thereof approximately ¼ inch from the metal in the bottom of the mold.

An arc was then struck between the electrode and the ingot mold, using a current ranging from 3000 to 3500 amps. at 15 volts. Upon initiation of the arc, metal and flux simultaneously fused, and dripped off the bottom end of the consumable electrode, thence to collect in the ingot mold. Some fusing of the metal and flux previously charged into the mold also occured, upon these being exposed to the heat resulting from the electric arc.

Arc melting of the electrode was continued for a period of approximately 2 hours and 15 minutes. During this time, an open arc was continuously maintained, and an anode point or arc contact area free of flux (about 6 inches in diameter) existed at all times on the top of the molten metal collecting in the ingot mold. Flux upon dissolving impurities in the molten metal was rejected to the side walls of the mold, and then solified, to form a shell about the inside of the mold. The fused metal also progressively solidified, starting at the base of the mold. The position of the electrode was changed periodically, to keep the base thereof about ¼ inch above the collecting pool of metal.

A fairly large evolution of gas was noted which was easily handled by the vacuum pumps. A vacuum ranging from 300–500 microns of mercury was maintained throughout.

At the conclusion of the arc melting of the electrode, the supply of electric current was stopped. The metal in the mold completely solidified in a short time. An ingot with a slag covering over top, bottom, and sides then was removed from the mold, having a rough weight (including slag) of approximately 353 lbs. This ingot then was cleaned, by removing slag and surface portions thereof, to produce a final ingot of 267 lbs. Also remaining after the fusion process was about 48 lbs. of stub, and 19 lbs. of other residue.

A second melt was then performed, employing procedures like those used in the just-described first melt, save that no flux was present during the second melt. The materials going into the melt, coming out of the melt, and furnace operating conditions, are summarized in the following table:

*Table II*

| Materials in: | Pounds |
|---|---|
| Electrode stub | 33 |
| Ingot from first melt | 267 |
| Steel turnings to mold | 28 |
| Total | 328 |
| Materials out: | |
| Stub | 36 |
| Ingot | 280 |
| Residue | 12 |
| Total | 328 |

Arc fusing time was 55 minutes.
A current of 5000–8000 amps. was used at 20–24 volts.
Vacuum maintained was 30–50 microns of mercury.
Ingot mold size (diameter) was 12 inches.

The slag recovered from the first melt had the following composition:

*Table III*

| | Percent |
|---|---|
| Fe, Ca | Over 10 |
| Si | 5–10 |
| Al, Cr | 1–5 |
| Mn | 1 |
| Ti, V, Mo, Ni | 0.1–1 |
| Co, Mg, Sn, Cb | 0.01–0.1 |

The arc fusing process described effected a substantial reduction of impurities, such as phosphorous and sulfur, in the steel processed, as is evident from the following table:

Furthermore, ultrasonic and metallographic examination revealed complete removal of inclusions.

It will be noted that alloying constituents may be added to the steel during the refining process, by proper selection of flux composition. This is demonstrated by the fact that the molybdenum content of the steel was raised by the refining process from less than 0.10% to 0.91%. Note that one of the materials used in the flux was $MoO_3$, and this material contributed molybdenum (after reduction of the oxide) to the alloy.

The ingot produced by the second melt showed no evidence of alloy segregation. The grain size was substantially uniform throughout.

It will be noted that the process contemplated is relatively easily carried out, to produce a refined product meeting quality standards. High-quality alloys are produceable from starting materials of substantially inferior grade.

While embodiments of the invention have been described, obviously variations and changes are possible without departing from the invention, and it is desired to cover all such variations as would be apparent to one skilled in the art, and that come within the scope of the appended claims.

We claim:

1. In a consumable electrode method of forming metal ingots from a metal body and a flux, wherein an ingot mold is supported beside a metal body in a position to collect a pool of molten metal arc fused off from said body, the method comprising establishing a controlled non-atmospheric environment extending from the metal body to the ingot mold, with said environment established, arc-fusing off successive portions of said metal body by passing an electric arc from said body to said ingot mold with said arc producing a heat zone extending from the body to the mold; concurrently with the arc-fusing of said body, adding progressively successive increments of flux to said heat zone with such flux melting and floating on said molten pool; concurrently with the progressive addition of such flux, continuously removing the flux from the heat zone by distributing the flux while molten and with the flux separated from the metal to regions spaced outwardly of the heat zone, to leave an area on the surface of the molten pool contacted by the arc which tends to remain free of flux; and while arc fusing off the metal and distributing the flux, maintaining the controlled non-atmospheric environment which extends from the metal body to the ingot mold, which environment embraces said area on the surface of the molten pool which tends to remain free of flux.

2. A consumable electrode method of forming metal ingots from a metal body comprising supporting said metal body beside an ingot mold with the latter in receiving relation to fused metal separating from said body, estabishing a vacuum about said metal body which extends uniformly from said metal body into said ingot mold, passing an arc-forming electric current through said metal body, thus to produce an arc in a heat zone extending from said metal body to said ingot mold, and progressively arc fusing off successive portions of said metal body with separation of these portions from said body, collecting said progressively fused portions in said mold with said fused portions forming a pool therein,

*Table IV*

| Product | Percent C | Percent P | Percent S | Percent Mn | Percent Mo | P.p.m. H₂ |
|---|---|---|---|---|---|---|
| Raw Steel | 0.895 | 0.014 | .030 | 0.80 | 0.10 | 40 |
| Ingot 2d Melt | 0.38 | 0.007 | 0.009 | .37 | 0.91 | 30 | concurrently with said arc fusing of said metal body adding progressively successive increments of flux to said heat zone, concurrently with the progressive addition of said flux continuously distributing said flux in a fused state in a region which extends about said zone and which excludes an area on the surface of said pool contacted by said arc, maintaining said vacuum about said metal body with said vacuum extending uniformly from said area contacted by said arc to said metal body, and concurrently with the distributing of said flux continuously removing portions of said flux to a region extending peripherally of said pool and cooling said removed flux whereby flux is prevented from collecting in said area on the surface of said pool.

3. A consumable electrode method of forming metal ingots from a metal body comprising supporting the metal body beside an ingot mold with the latter in receiving relation to fused metal separating from said body, establishing a vacuum about said body which extends uniformly from said body into said ingot mold, passing an arc-forming electric current through said metal body, thus to produce an arc in a heat zone extending from said body to said ingot mold, and progressively arc fusing off successive portions of said metal body, with separation of these portions from said body, said arc fusing of the metal body being accompanied with progressive advancements of said body toward said ingot mold, collecting said progressively fused portions of said metal body in said mold with said fused portions forming a pool therein, concurrently with said arc fusing of said metal body advancing progressively successive increments of flux into said heat zone by feeding solid flux into the heat zone, said progressive feedings of solid flux being accomplished by holding a supply of the flux on said progressively advanced metal body, concurrently with the progressive addition of said flux, continuously distributing said flux in a fused state in a region which extends about the heat zone and which excludes an area on the surface of said molten pool contacted by said arc, concurrently with the distributing of said flux continuously removing portions of the flux to a region extending peripherally of the pool and cooling said removed flux whereby flux is prevented from collecting in said area on the surface of said pool, and maintaining said vacuum about said metal body with said vacuum extending uniformly from said metal body to said area contacted by said arc during the arc fusing of said metal body.

References Cited by the Examiner

UNITED STATES PATENTS

| | | | |
|---|---|---|---|
| 3,067,473 | 12/1962 | Hopkins | 22—200 XR |
| 3,072,982 | 1/1963 | Gordon et al. | 22—200 |

FOREIGN PATENTS

| | | |
|---|---|---|
| 825,087 | 12/1959 | Great Britain. |
| 1,255,349 | 1/1961 | France. |

J. SPENCER OVERHOLSER, *Primary Examiner.*

R. S. ANNEAR, *Assistant Examiner.*